United States Patent
Rash et al.

(10) Patent No.: US 9,734,205 B2
(45) Date of Patent: Aug. 15, 2017

(54) QUERY PREDICTION

(71) Applicant: Facebook, Inc., Menlo Park, CA (US)

(72) Inventors: Samuel Rash, Fremont, CA (US); Timothy Williamson, Palo Alto, CA (US); Martin Traverso, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 703 days.

(21) Appl. No.: 13/865,916

(22) Filed: Apr. 18, 2013

(65) Prior Publication Data

US 2014/0317140 A1 Oct. 23, 2014

(51) Int. Cl.
*G06F 17/30* (2006.01)

(52) U.S. Cl.
CPC .. *G06F 17/30483* (2013.01); *G06F 17/30315* (2013.01)

(58) Field of Classification Search
None
See application file for complete search history.

(56) References Cited

U.S. PATENT DOCUMENTS

| | | | | |
|---|---|---|---|---|
| 6,023,695 | A * | 2/2000 | Osborn | G06F 17/30595 |
| 6,775,681 | B1 * | 8/2004 | Ballamkonda | G06F 17/30454 707/718 |
| 7,890,497 | B2 * | 2/2011 | Folkert | G06F 17/30383 707/602 |
| 2007/0239673 | A1 * | 10/2007 | Barsness | G06F 17/30463 |
| 2009/0019018 | A1 * | 1/2009 | Chaves | G06F 17/30466 |

* cited by examiner

*Primary Examiner* — Charles Adams
(74) *Attorney, Agent, or Firm* — Perkins Coie LLP

(57) ABSTRACT

Disclosed here are methods, systems, paradigms and structures for predicting queries, creating tables to store data for the predicted queries, and selecting a particular table to obtain the data from in response to a query. The methods include determining various combinations of a finite set of columns users may query on, based on (i) a list of columns users are interested in obtaining data for, and (ii) cardinality information of a column or combinations of columns in the list of columns. The methods further includes creating various tables based on the determined combinations of the columns using a meta query language. A query is responded to by selecting a table that has least number of rows, among the tables that satisfy query parameters. The methods include selecting a table that has a longest sequence of columns matching with a portion of the query parameters.

17 Claims, 7 Drawing Sheets

QUERY PREDICTION

FIELD OF INVENTION

This invention generally relates to processing queries in computer systems. More specifically, the invention relates to predicting queries, creating tables to store data for the predicted queries, and obtaining data from the created tables in response to a query.

BACKGROUND

In computer related technologies, certain applications such as reports are generated to obtain information on various aspects. For example, in a social networking environment reports may be generated for obtaining information such as the list of users who visited a particular website over a predefined period, number of comments made by users in the last hour, etc. The information presented in the reports is retrieved from a database. Obtaining results from the database every time a report is generated consumes significant computing resources and causes a significant delay.

In at least some embodiments, the queries obtaining the data from one or more tables in the data consume significantly more time if the structure or the design of the one or more tables is not efficient for a particular type of query. The tables may be efficient for a query with a first set of query parameters but not for a query with a second set of query parameters. For example, consider two queries—query Q1 and query Q2 which are looking for specific data in a table A. Consider that query Q1 is searching for data S, T, V, X, Y, and has a "where" clause with some values of X, Y, T, S. Consider that query Q2 is searching for data X, Y and has a "where" clause with some values of X and Y. Further, consider that table A has columns S, T, U, V, W, X, Y and Z, and has "n" number of rows in it.

The query Q1 searching for data S, T, V, X, Y has to scan through "n" rows and then filter the "n" rows based on the values of X, Y, T, S to obtain the query result. Query Q2, which is just searching for X, Y, also has to scan through all the "n" rows before it filters out the scanned rows based on the values of X and Y to obtain the query result. However, the table A is less efficient for query Q2 (than query Q1) since it has a large amount of data than needed for the query. The table A would be more efficient if it had lesser data or only the data, for example, lesser number of columns or only columns X, Y, required by query Q2. A table with a fixed set of columns may not be efficient for different queries with different set of query parameters. Some embodiments have suggested creating indexes in tables to make the search faster. However, the amount of data to be scanned by the different query would still be the same.

SUMMARY

Introduced here are methods, systems, paradigms and structures for predicting queries, creating tables to store data for the predicted queries, and selecting a particular table to obtain the data from when a particular query is received. The methods include selecting a table that has lesser number of total rows to be read by a query before the total rows are filtered out to obtain the query results that match a filter criteria of the query. One possible method of selecting such a table with lesser number of total rows includes selecting one of many tables that has a longest common prefix with a portion of query parameters. The longest common prefix is a longest sequence of a plurality of columns of the table that matches with a portion of the query parameters, such as columns of a filter criteria or a "where" clause of the query.

One possible method for predicting queries includes predicting queries using a meta query language (MQL). A user may provide input on the list of columns the user is interested in querying on, for example, via a user interface. The MQL can predict various permutations and combinations of the queries based on the user provided list of columns and statistics such as cardinality information of a column or combinations of the columns in the list of columns. The MQL can concisely express a very large set of potential future queries. The various combinations of the columns are different subsets of a finite set of columns that can exist in an application. The methods further include creating tables based on the queries predicted by the MQL. As time progresses, more statistical information such as cardinality information, actual queries executed, etc. is available and the tables may be adapted, that is, more tables may be created, existing tables may be altered or deleted accordingly.

Some embodiments of the invention have other aspects, elements, features, and steps in addition to or in place of what is described above. These potential additions and replacements are described throughout the rest of the specification.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed here are methods, systems, paradigms and structures for predicting queries, creating tables to store data for the predicted queries, and selecting a particular table to obtain the data from when a particular query is received. The methods include selecting a table that has lesser number of total rows to be read by a query before the total rows are filtered out to obtain the query results that match a filter criteria of the query. One possible method of selecting such a table with lesser number of total rows includes selecting one of many tables that has a longest common prefix with a portion of query parameters. The longest common prefix is a longest sequence of a plurality of columns of the table that matches with a portion of the query parameters, such as columns of a filter criteria or a "where" clause of the query.

One possible method for predicting queries includes predicting queries using a meta query language (MQL). A user may provide input on the list of columns the user is interested in querying on, for example, via a user interface. The MQL can predict various permutations and combinations of the queries based on the user provided list of columns and statistics such as cardinality information of a column or combinations of the columns in the list of columns. The MQL can concisely express a very large set of potential future queries. The various combinations of the columns are different subsets of a finite set of columns that can exist in an application. The methods further include creating tables based on the queries predicted by the MQL. As time progresses, more statistical information such as cardinality information, actual queries executed, etc. is available and the tables may be adapted, that is, more tables may be created, existing tables may be altered or deleted accordingly.

Figure 1:
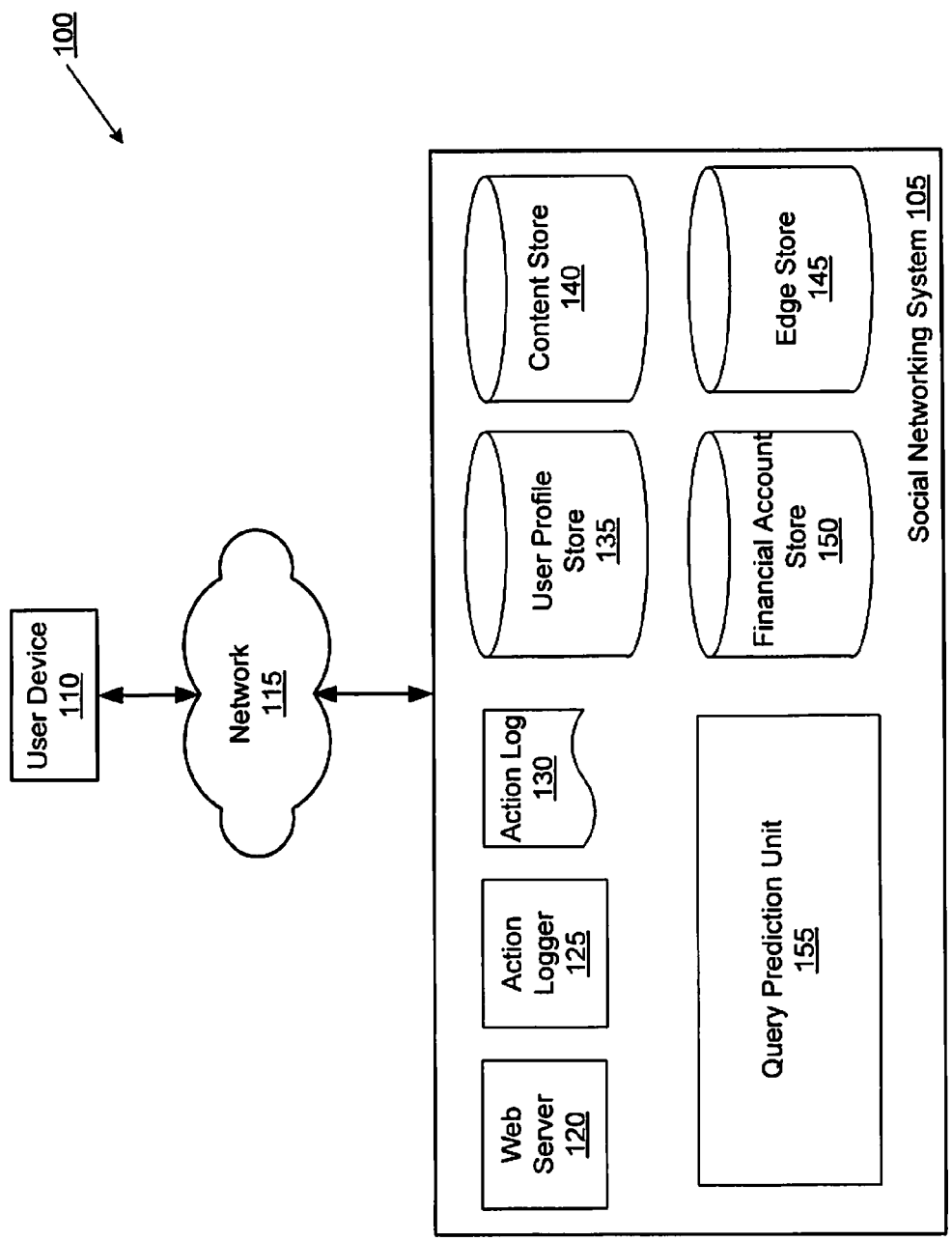
FIG. 1 is an environment in which an embodiment of the invention may operate.

FIG. 1 is an environment 100 including a social networking system 105 with which some embodiments of the present invention may be utilized, according to an embodiment of the disclosed technique. The system environment 100 includes a user device 110 interacting with a social networking system 105 over a network 115. In other embodiments, the system environment 100 may include different and/or additional components than those shown by FIG. 1.

The social networking system 105 comprises one or more computing devices storing user profiles associated with users and/or other objects as well as connections between users and other users and/or objects. In use, users join the social networking system 105 and then add connections to other users or objects of the social networking system to which they desire to be connected. As further described below, users of the social networking system 105 may be individuals or entities such as businesses, organizations, universities, manufacturers. The social networking system 105 allows its users to interact with each other as well as with other objects maintained by the social networking system 105. In some embodiments, the social networking system 105 allows users to interact with third-party websites and financial account providers.

Based on stored data about users, objects and connections between users and/or objects, the social networking system 105 generates and maintains a "social graph." comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 105 modifies edges connecting the various nodes to reflect the interactions.

A user device 110 is a computing device capable of receiving user input as well as transmitting and/or receiving data via the network 115. In one embodiment, the user device 110 is a conventional computer system, such as a desktop or laptop computer. In another embodiment, the user device 110 may be a device having computer functionality, such as a personal digital assistant (PDA), mobile telephone, smart-phone or similar device. The user device 110 is configured to communicate with the social networking system 105, and/or the financial account provider via the network 115. In one embodiment, the user device 110 executes an application allowing a user of the user device 110 to interact with the social networking system 105. For example, the user device 110 executes a browser application to enable interaction between the user device 110 and the social networking system 105 via the network 115. In another embodiment, a user device 110 interacts with the social networking system 105 through an application programming interface (API) that runs on the native operating system of the user device 110, such as IOS® or ANDROID™.

The user device 110 are configured to communicate via the network 115, which may comprise any combination of local area and/or wide area networks, using both wired and wireless communication systems. In one embodiment, the network 115 uses standard communications technologies and/or protocols. Thus, the network 115 may include links using technologies such as Ethernet, 102.11, worldwide interoperability for microwave access (WiMAX), 3G, 4G, CDMA, digital subscriber line (DSL), etc. Similarly, the networking protocols used on the network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 115 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The social networking system 105 includes a web server 120, an action logger 125, an action log 130, a user profile store 135, a content store 140, an edge store 145, a financial account store 150, and a query prediction unit 155. In other embodiments, the social networking system 105 may include additional, fewer, or different modules for various applications. Conventional components such as network interfaces, security mechanisms, load balancers, failover servers, management and network operations consoles, and the like are not shown so as to not obscure the details of the system architecture.

Web server 120 links social networking system 105 via network 115 to one or more user devices 110; the web server 120 serves web pages, as well as other web-related content, such as Java, Flash, XML, and so forth.

Each user of the social networking system 105 is associated with a user profile, which is stored in the user profile store 135. A user profile includes declarative information about the user that was explicitly shared by the user, and may also include profile information inferred by the social networking system 105. In one embodiment, a user profile includes multiple data fields, each data field describing one or more attributes of the corresponding user of the social networking system 105. The user profile information stored in user profile store 135 describes the users of the social networking system 105, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 105 displayed in an image. A user profile in the user profile store 135 may also maintain references to actions by the corresponding user performed on content items in the content store 140 and stored in the edge store 145.

A user profile may be associated with one or more financial accounts, allowing the user profile to include data retrieved from or derived from a financial account. A user may specify one or more privacy settings, which are stored in the user profile, that limit information from a financial account that the social networking system 105 is permitted to access. For example, a privacy setting limits the social networking system 105 to accessing the transaction history of the financial account and not the current account balance. As another example, a privacy setting limits the social networking system 105 to a subset of the transaction history of the financial account, allowing the social networking system 105 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 105. In one embodiment, information from the financial account is stored in the user profile store 135. In other embodiments, it may be stored in the financial account store 150.

The content store 140 stores content items associated with a user profile, such as images, videos or audio files. Content items from the content store 140 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 105. Examples of social networking content items include suggested connections or suggestions to perform other actions, media provided to, or maintained by, the social networking system 105 (e.g., pictures or videos), status messages or links posted by users to the social networking system, events, groups, pages (e.g., representing an organization or commercial entity), and any other content provided by, or accessible via, the social networking system.

The content store 140 also includes one or more pages associated with entities having user profiles in the user profile store 135. An entity is a non-individual user of the social networking system 105, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 140, allowing social networking system users to more easily interact with the vendor via the social networking system 105. A vendor identifier is associated with a vendor's page, allowing the social networking system 105 to identify the vendor and/or to retrieve additional information about the vendor from the user profile store 135, the action log 130 or from any other suitable source using the vendor identifier. In some embodiments, the content store 140 may also store one or more targeting criteria associated with stored objects and identifying one or more characteristics of a user to which the object is eligible to be presented.

The action logger 125 receives communications about user actions on and/or off the social networking system 105, populating the action log 130 with information about user actions. Such actions may include, for example, adding a connection to another user, sending a message to another user, uploading an image, reading a message from another user, viewing content associated with another user, attending an event posted by another user, among others. In some embodiments, the action logger 125 receives, subject to one or more privacy settings, transaction information from a financial account associated with a user and identifies user actions from the transaction information. For example, the action logger 125 retrieves vendor identifiers from the financial account's transaction history and identifies an object, such as a page, in the social networking system associated with the vendor identifier. This allows the action logger 125 to identify a user's purchases of products or services that are associated with a page, or another object, in the content store 140. In addition, a number of actions described in connection with other objects are directed at particular users, so these actions are associated with those users as well. These actions are stored in the action log 130.

The action log 130 may be used by the social networking system 105 to track user actions on the social networking system 105, as well as external website that communicate information to the social networking system 105. Users may interact with various objects on the social networking system 105, including commenting on posts, sharing links, and checking-in to physical locations via a mobile device, accessing content items in a sequence or other interactions. Information describing these actions is stored in the action log 130. Additional examples of interactions with objects on the social networking system 105 included in the action log 130 include commenting on a photo album, communications between users, becoming a fan of a musician, adding an event to a calendar, joining a groups, becoming a fan of a brand page, creating an event, authorizing an application, using an application and engaging in a transaction. Additionally, the action log 130 records a user's interactions with advertisements on the social networking system 105 as well as other applications operating on the social networking system 105. In some embodiments, data from the action log 130 is used to infer interests or preferences of the user, augmenting the interests included in the user profile and allowing a more complete understanding of user preferences.

The action log 130 may also store user actions taken on external websites and/or determined from a financial account associated with the user. For example, an e-commerce website that primarily sells sporting equipment at bargain prices may recognize a user of a social networking system 105 through social plug-ins that enable the e-commerce website to identify the user of the social networking system 105. Because users of the social networking system 105 are uniquely identifiable, e-commerce websites, such as this sporting equipment retailer, may use the information about these users as they visit their websites. The action log 130 records data about these users, including webpage viewing histories, advertisements that were engaged, purchases made, and other patterns from shopping and buying. Actions identified by the action logger 125 from the transaction history of a financial account associated with the user allow the action log 130 to record further information about additional types of user actions.

In one embodiment, an edge store 145 stores the information describing connections between users and other objects on the social networking system 105 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 105, such as expressing interest in a page on the social networking system, sharing a link with other users of the social networking system, and commenting on posts made by other users of the social networking system. The edge store 145 stores edge objects that include information about the edge, such as affinity scores for objects, interests, and other users. Affinity scores may be computed by the social networking system 105 over time to approximate a user's affinity for an object, interest, and other users in the social networking system 105 based on the actions performed by the user. Multiple interactions between a user and a specific object may be stored in one edge object in the edge store 145, in one embodiment. In some embodiments, connections between users may be stored in the user profile store 135, or the user profile store 135 may access the edge store 145 to determine connections between users.

The query prediction unit 155 improves the efficiency of query responses in the social networking system 105. In at least some embodiments, the query prediction unit 155 predicts queries, creates various tables to store data for the predicted queries, and responds to a given query by selecting an appropriate table from the created tables to obtain the query results from in an efficient manner.

Figure 2:
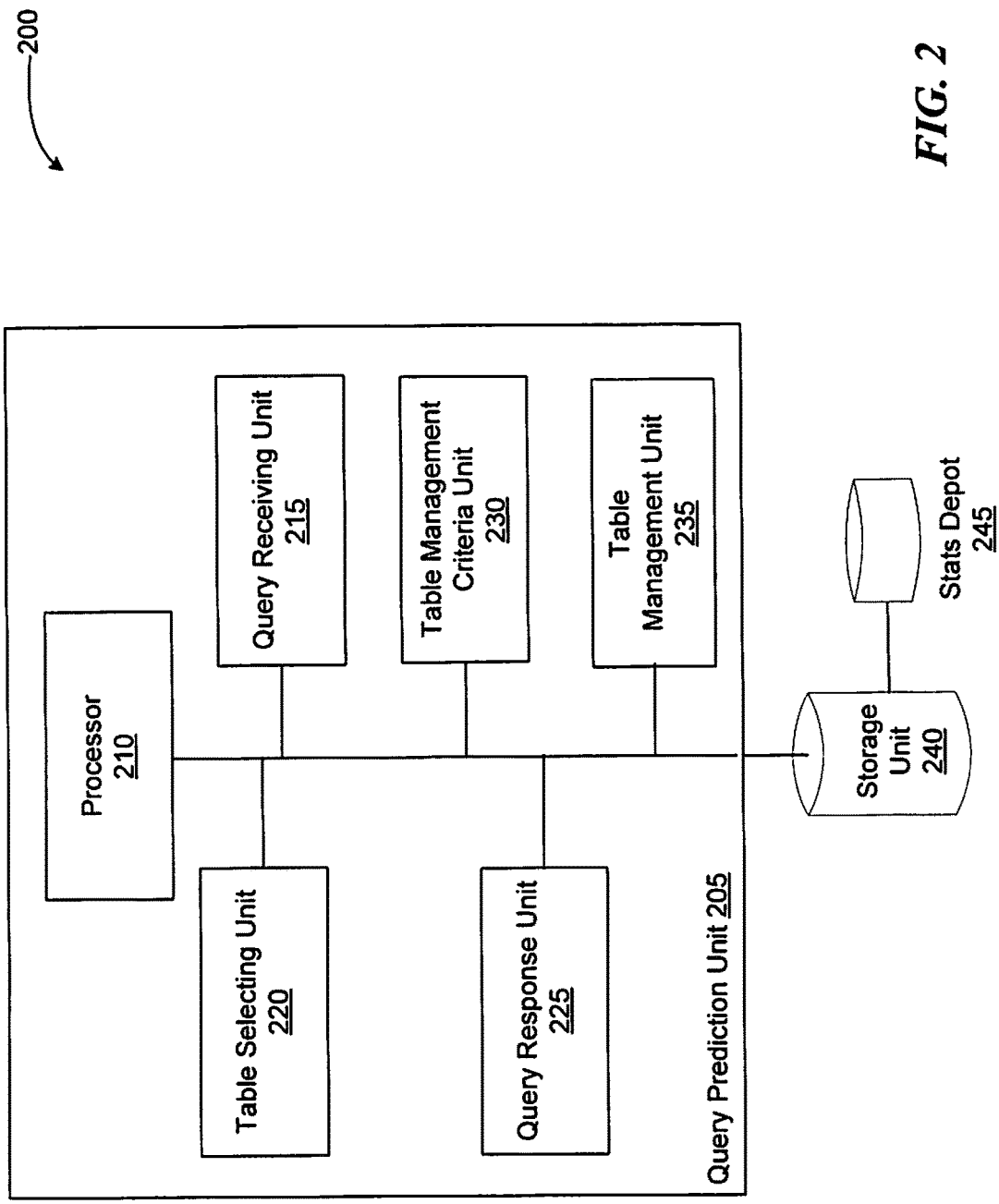
FIG. 2 is a block diagram illustrating a query prediction unit.

FIG. 2 is a block diagram illustrating a system 200 including a query prediction unit 205, according to an embodiment of the disclosed technique. In an embodiment, the query prediction unit 205 can be similar to the query prediction unit 155 of FIG. 1. As described above with reference to FIG. 1, the query prediction unit 205 can be used to predict queries, create various tables to store data for the predicted queries, and to respond to a given query by selecting an appropriate table from the created tables. The query prediction unit 205 includes a query receiving unit 215 that works in cooperation with a processor 210 to receive a query, a table selecting unit 220 that selects a table to obtain the query results from, and a query response unit 225 that obtains the query results from the selected table. The query prediction unit 205 further includes a table management criteria unit 230 that determines criteria for creating, altering, or deleting tables, and a table management unit 235 that creates, deletes, or alters tables in a storage unit 240 based on the determined criteria.

In the social networking system 105, various types of data, such as information regarding applications, users, services, transactions, etc., are stored in the storage unit 240. The storage unit 240 can be at least one of user profile store 135, content store 140, financial account store 150, or edge store 145 as described in FIG. 1. The storage unit 240 can be implemented as a database. In the social networking system 105, queries requesting various types of data can be received. The queries are executed on one or more tables, and the results are returned to the requesting entity.

Generally, for a query, larger the volume of data in a table, higher is the computing resources consumed by the query to obtain the query results. Accordingly, in order to minimize the consumption of computing resources, a table which has less data, for example, lesser number of rows to be read from, is selected. The query receiving unit 215 receives a query from an entity such as an application, user, etc. in the social networking system 105. The table selecting unit 220 selects an appropriate table, for example, a table which has lesser number of rows to be read, in the storage unit 240. After the appropriate table is selected, the query response unit 225 obtains the query results from the selected table and returns the query results to the entity that issued the query.

In at least some embodiments, the table selecting unit 220 selects the table based at least on a longest common prefix between the table and a portion of the query parameters. The longest common prefix between the table and the query parameters can include, for example, a longest sequence of columns of a table that matches with the columns in "where" or "select" clause of the query. However, in other embodiments, various other criteria may be considered in selecting a particular table to enhance the query response time.

Since queries can include different parameters and can be executed on different columns, a number of tables with different combinations of a finite set of columns are created. In at least some embodiments, the different combinations of the columns are determined by predicting the queries that can be received in the social networking system 105. When a query with a particular set of query parameters is received, a table with a particular combination of columns that is best suited for the query is selected to obtain the query results from. The techniques of creating tables based on the predicted queries, and selecting a particular table for responding to a query are further described in the following paragraphs with reference to FIG. 3.

Figure 3A:
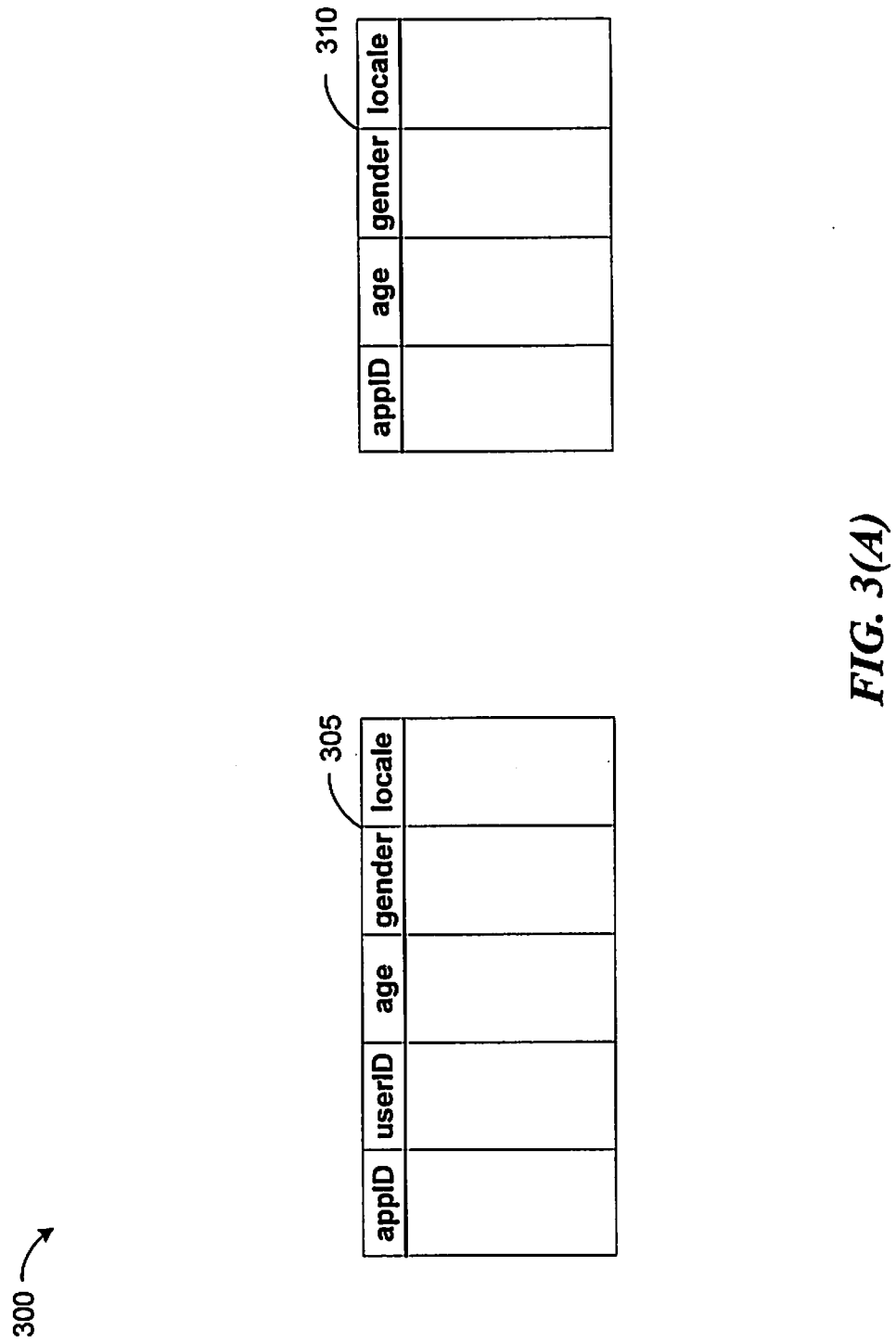
FIG. 3, which includes FIGS. 3(A) and 3 (B), is an example illustrating a plurality of tables created in the social networking system by the query prediction unit.
Figure 3B:
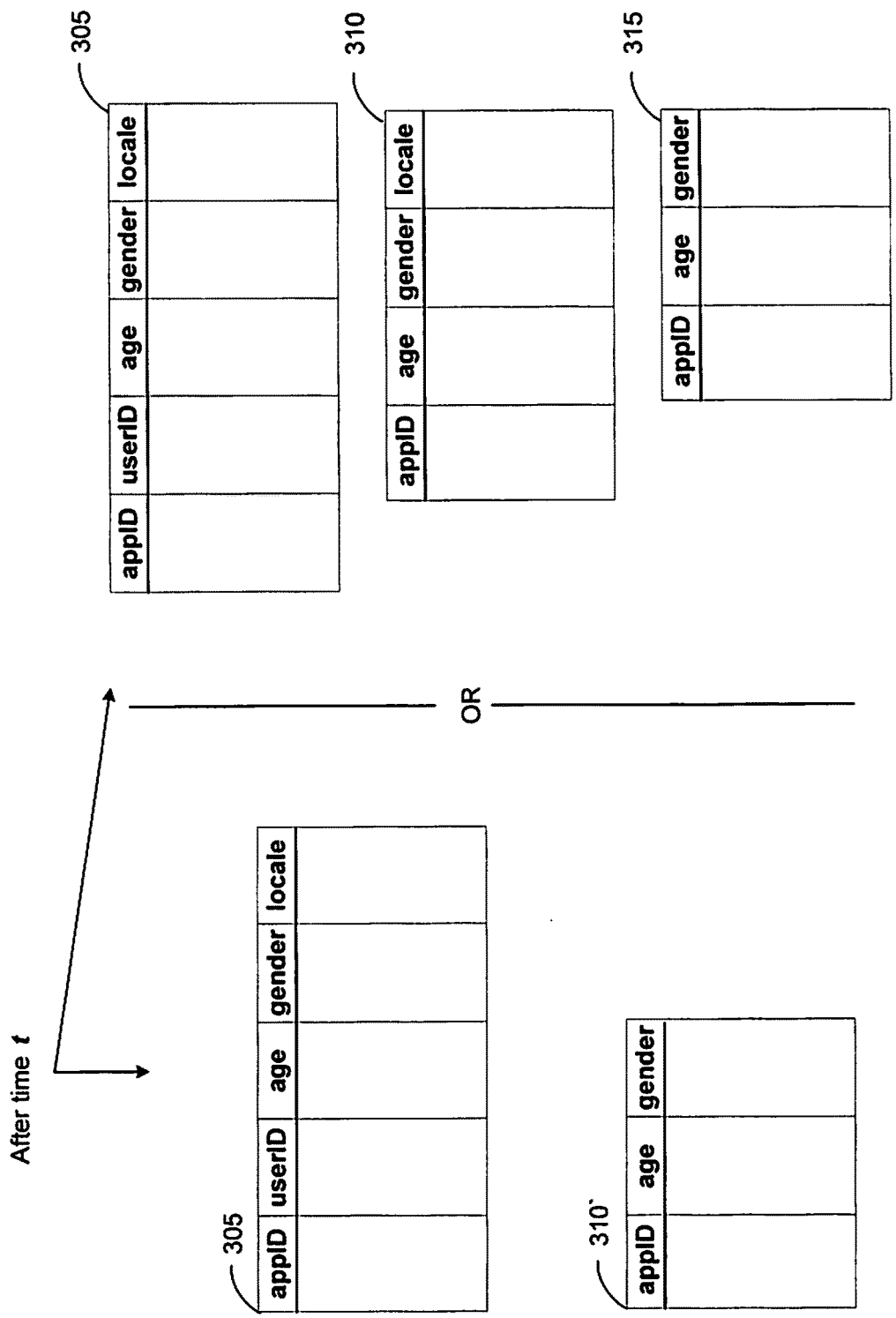

FIG. 3, which includes FIGS. 3(A) and 3(B), is an example 300 illustrating a plurality of tables 305 and 310 created in the social networking system 105 based on query prediction, according to an embodiment of the disclosed technique. The example may be implemented in system such as system 200 of FIG. 2. The tables 305 and 310 may be stored in the storage unit 240. FIG. 3(A) illustrates a table 305 including data such as "appID" of an application, "user ID" of a user using the application, "gender" of the user, and "locale" of the user as columns of the table 305; and a table 310 including data such as "appID" of an application, "gender" of a user using the application, and "locale" of the user as columns of the table.

For a given set of users and a given set of applications, it is safe to assume that table 305 would have more data, that is, more number of rows than table 310 since table 310 does not contain "userID" column. For example, if there are "m" applications and each application has "n" users, the table 305 can have at least (n*m) rows, whereas the table 310 would have less than (n*m) rows since it does not contain "userID" data.

Consider, for example, the query receiving unit 215 receives a user query for retrieving number of users who are (a) using an application with appID=10001 and (b) in the ages between 20 and 30. A portion of the user query can be as follows:

SELECT COUNT (1)
FROM ...
WHERE appID=10001, age = "20-30"

"Count (1)" which provides a count of the number of records in the result set of the query is an example of aggregation criterion. For the given set of query parameters (appID=10001, age="20-30"), the table selecting unit 220 selects a table that is most efficient, for example, a table that has lesser number of rows to read from, for the received query. Since table 310 has lesser number of rows than the table 305, the table selecting unit 220 selects the table 310 to obtain the query results from. In at least some embodiments, the table selecting unit 220 selects the table 310 based on the longest common prefix between the query parameters and the tables 305 and 310. The prefix of a table is sequence of leading columns of the table starting from the first column. The prefix of the query includes columns in the filter criteria such as the "where" clause of the query. For the above user query, the prefix includes "appID" and "age." The prefix of the table 305 includes "appID, userID, age, . . . " and that of table 310 includes "appID, age, . . . ." Accordingly, the longest common prefix between the query parameters and the tables is "appID, age, . . . ." Thus, the table selecting unit 220 selects table 310 to retrieve the query results from. After the table selecting unit 220 selects the table 310, the query response unit 225 obtains the query results from table 310.

In the above example, if the "where" clause of the user query included "userID," then the longest common prefix would be "appID, userID, age, . . . ," and thus, table 305 would be selected instead of table 310.

Various other queries having different combinations of columns in their respective "where" clause can be received in the social networking system 105. A table that is more efficient for one query may not be for another query as is evident from the above example (Table 305 is more efficient for query with "appID, userID, age, . . . " in the "where" clause than for a query with "appID, age, . . . "). Accordingly, tables with different combinations of columns have to be created to serve different queries.

In at least some embodiments, tables with various combinations of columns can be created based on query prediction. The methods include predicting queries that may be received in the social networking system 105, and creating the tables based on the predicted queries to store the data for the predicted queries. Queries can be predicted by employing various prediction techniques. In some embodiments, queries are predicted based on data regarding previously executed queries. However, in an application such as social networking system 105, the total number of data attributes (that can be created as columns of a table) in the application may be significantly large. Accordingly, number of predicted queries having various combinations of columns is also large. For example, if there is a table with fifty columns, then $2^{50}$ queries may be created, which is huge.

To minimize the number of tables created (and therefore, amount of storage space occupied to store duplicate data), and to create tables for queries for which efficiency is improved significantly, tables are created using meta query language (MQL). The MQL can predict various permutations and combinations of the queries based, at least, on (a) a list of columns a user is interested in querying on or (b) statistical information such as cardinality information of the columns. The MQL can concisely express a very large set of potential future queries. For example, for a table with fifty columns, the MQL may suggest 10,000 queries instead of $2^{50}$ queries. The table management criteria unit 230 may initially determine to create tables for a subset of the 10,000 queries, for example, 100 tables.

As time progresses, more statistical information such as cardinality information, actual queries executed, etc. is available and the tables may be adapted, that is, more tables may be created, existing tables may be altered or deleted accordingly.

An example of a MQL query includes:
   select x,{y,{a,b,c}{0,3}}?, {z,{a,b,c{0,3}}?, {a,b,c}{0, 3}, aggregation criteria The MQL can be similar to a regular expression. The above MQL can mean that user may be interested in queries such as
   select x, aggregation criteria
   select x, y, a, aggregation criteria
   select x, a, b, c aggregation criteria The MQL can suggest many such permutations and combinations of the list of columns x, y, z, a, b, and c. The table management criteria unit 230 may consider a subset of the combinations suggested by the MQL for creation by the table management unit 235. The MQL may also specify durability requirements, for example, permanent or ephemeral, for a table. In some embodiments, a table may not be created for every predicted query. Factors such as (a) a number of tables to be created, (b) information on categories in which new data is generated at significantly high rate, (c) amount of storage space available in the storage unit 240 to store the tables, (d) the categories of queries received frequently, (e) the application for which queries are received frequently, etc. may also be considered in adapting the tables.

In the example of FIG. 3, the table management unit 235 creates the tables, such as tables 305 and 310, based on the table creation criteria determined initially by table management criteria unit 230. The tables 305, 310 may be altered or dropped or new tables may be created as and when more information is available from the stats depot 245. For example, the table management criteria unit 230 may determine that "locale" is not being queried on or asked for frequently. Accordingly, after time t, table management unit 235 may alter table 305 by dropping column "locale" to create a table 310' or it may create another table 315 with only "appID," "age," and "gender" columns as shown in FIG. 3B.

The efficiency of a query with a given filter criteria on a given table is dependent on cardinality information of a column or a combination of columns in the table. High cardinality columns are those with very unique or uncommon data values. For example, in a database table that stores bank account numbers, the "Account Number" column has very high cardinality. Similarly, the "userID" in the table 305, and the "appID" in the tables 305 and 310 have high cardinality. Low cardinality columns are those with very few unique values. In the tables 305 and 310, a low cardinality column will be, for example, the "Gender" column. This column will likely only have "M" and "F" as the range of values to choose from, and all the thousands or millions of records in the table can only pick one of these two values for this column. The cardinality information and other statistical information such as information regarding previously executed queries, tables, etc. generated by the query prediction unit 205 may be stored in a storage system such as stats depot 245. The stats depot 245 can be, for example, a database.

In an embodiment, the performance of a query improves significantly when the high cardinality columns are chosen as leading columns of the table. Accordingly, tables are created with higher cardinality columns as leading columns of the table. Further, the filter criteria of a query generally includes high cardinality columns more often than low cardinality columns. Accordingly, in at least some embodiments, table management criteria unit 230 attributes more weight to creating tables with different combinations of high cardinality columns than to creating tables with different combinations of low cardinality columns. In an embodiment, a criteria for defining a particular column as a high cardinality or low cardinality column may be configured by the user.

Further, the cardinality value of an individual column may vary when the individual column is combined with another column. For example, the cardinality of columns "appID, userID" is higher than cardinality of columns "appID" or "user ID." Accordingly, the table management criteria unit 230 can consider creating, for example, three tables with different combinations of columns "appID" and "userID"— one table with "appID," another with "userID" and another with "appID, userID"—since all three combinations are high cardinality combinations. Further, in at least some embodiments, the columns in the table may be arranged in decreasing order of their cardinality values.

In another example, the cardinality of columns "appID, age, gender, locale" may not be significantly higher compared to the cardinality of columns "appID, age, gender" since "locale" may not be considered as a high cardinality column. Accordingly, if a table having all of "appID, age, gender, locale" columns, such as table 310, exists, then creating a new table having just "appID, age, gender" may not be beneficial since the number of rows to be read by a query in the new table is not significantly lesser compared to the number of rows in the table 310.

As can be appreciated from the foregoing, the efficiency of a query can be improved by selecting a table that has longest common prefix between the filter criteria of the query and the sequence of the leading columns of the table. The techniques include creating a table designed to store data for the query, and storing the data as required by the query. Creating the tables with various combinations of columns includes (a) obtaining a list of columns a user is interested in potentially querying on, (b) obtaining the cardinality information of each of the columns and/or combinations of the columns in the list of the columns, (c) predicting queries using MQL (which is based at least in part on the user selected columns and cardinality information), and (d) creating/altering/deleting tables based on the predicted queries.

In at least some embodiments, the tables 305 and 310 may include a header which contains information regarding the tables. Further, the tables 305 and 310 may act as virtual or secondary tables that contains data which is a duplicate of the data from other primary information sources such as user profile store 135, content store 140, financial account store 150, edge store 145, etc. of the social networking system 105. The columns of the tables 305 and 310 (which is actually data attributes) is a subset of a finite set of columns that can exist in an application such as the social networking system 105. In at least some embodiments, the query prediction unit 205 obtains data to be stored in the created tables from real-time data streams generated by applications.

Figure 4:
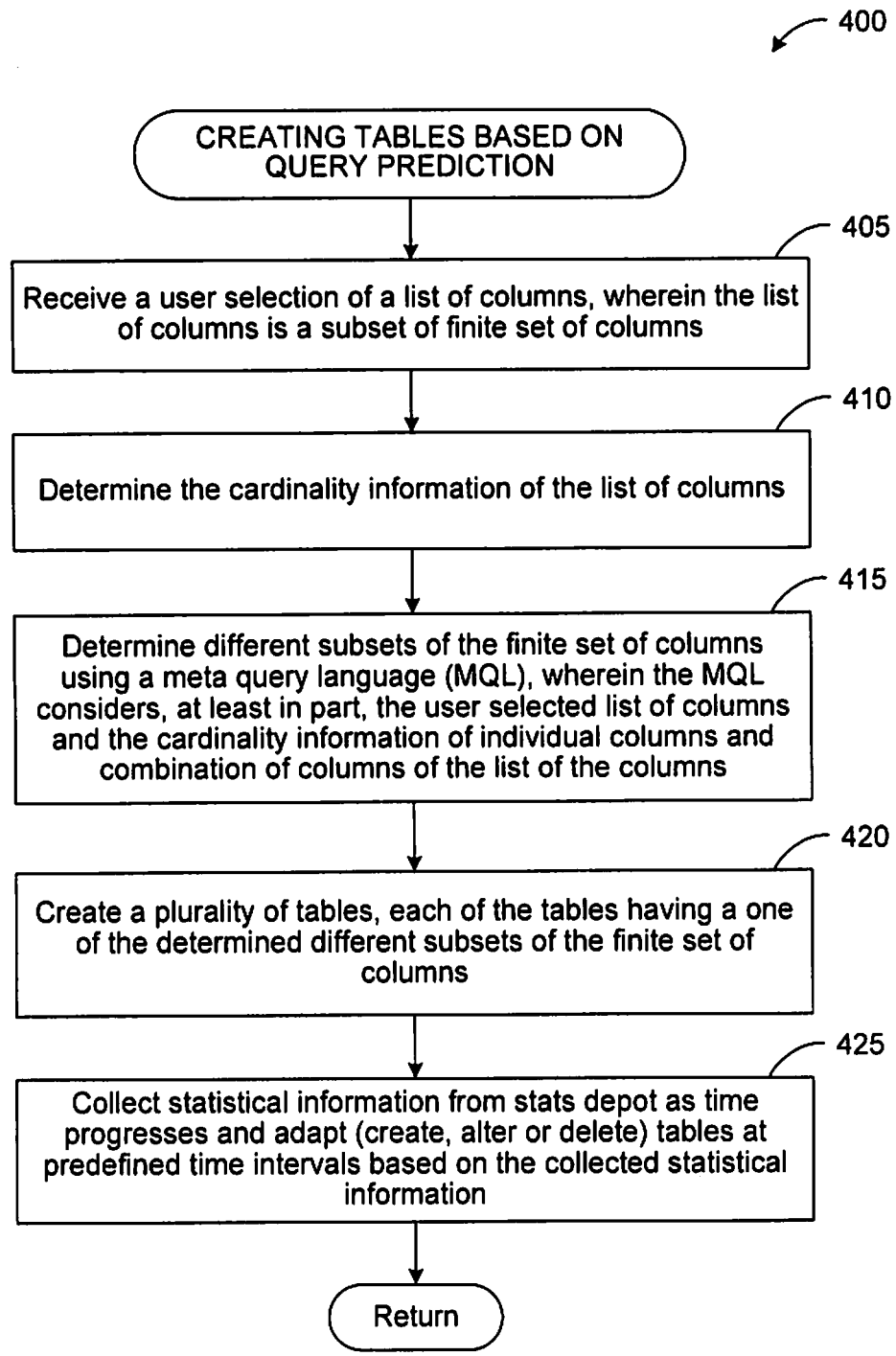
FIG. 4 is a flow diagram illustrating a process of creating tables with different combinations of columns.

FIG. 4 is a flow diagram illustrating a process 400 of creating tables with different combinations of columns, according to an embodiment of the disclosed technique. The process 400 may be executed in a system such as system 200 of FIG. 2. At step 405, the table management criteria unit 230 receives a user selection of a list of columns the user is interested in potentially querying on. The list of columns is a subset of a finite set of columns (or data attributes) that can exist in an application such as social networking system 105. In an embodiment, the user may input the list of columns via a user interface that is rendered on a user device such as user device 110 of FIG. 1. The user may further specify the list of columns that can be included in (a) filter criteria such as "where" clause of the query and/or (b) "select" clause of the query, etc.

At step 410, the table management criteria unit 230 determines the cardinality information of the user selected columns. The cardinality information includes cardinality information of individual columns and combinations of various columns. At step 415, the table management criteria unit 230 determines different combinations (or subsets) of the finite set of the columns using the MQL. The MQL predicts the queries based, at least in part, on the list of user selected columns and the cardinality information of the columns determined in step 410. In an embodiment, the different subsets of the columns are the columns that may be included in potential future user queries. At step 420, the table management unit 235 creates a plurality of tables having the different combinations of the columns determined in step 415.

At step 425, the table management unit 235 continuously monitors the stats depot to 245 to collect statistical information such as cardinality information of the columns, actual queries executed, information on categories in which new data is generated at significantly high rate, amount of storage space available in the storage unit 240 to store the tables, the categories of queries received frequently, the application for which queries are received frequently, etc. The table management unit 235 adapts the tables based on the collected information. In an embodiment, the tables may be adapted at predefined intervals of time, predefined number of times in a day, week, month, when query response time goes below a predefined threshold for a predefined time, etc.

Figure 5:
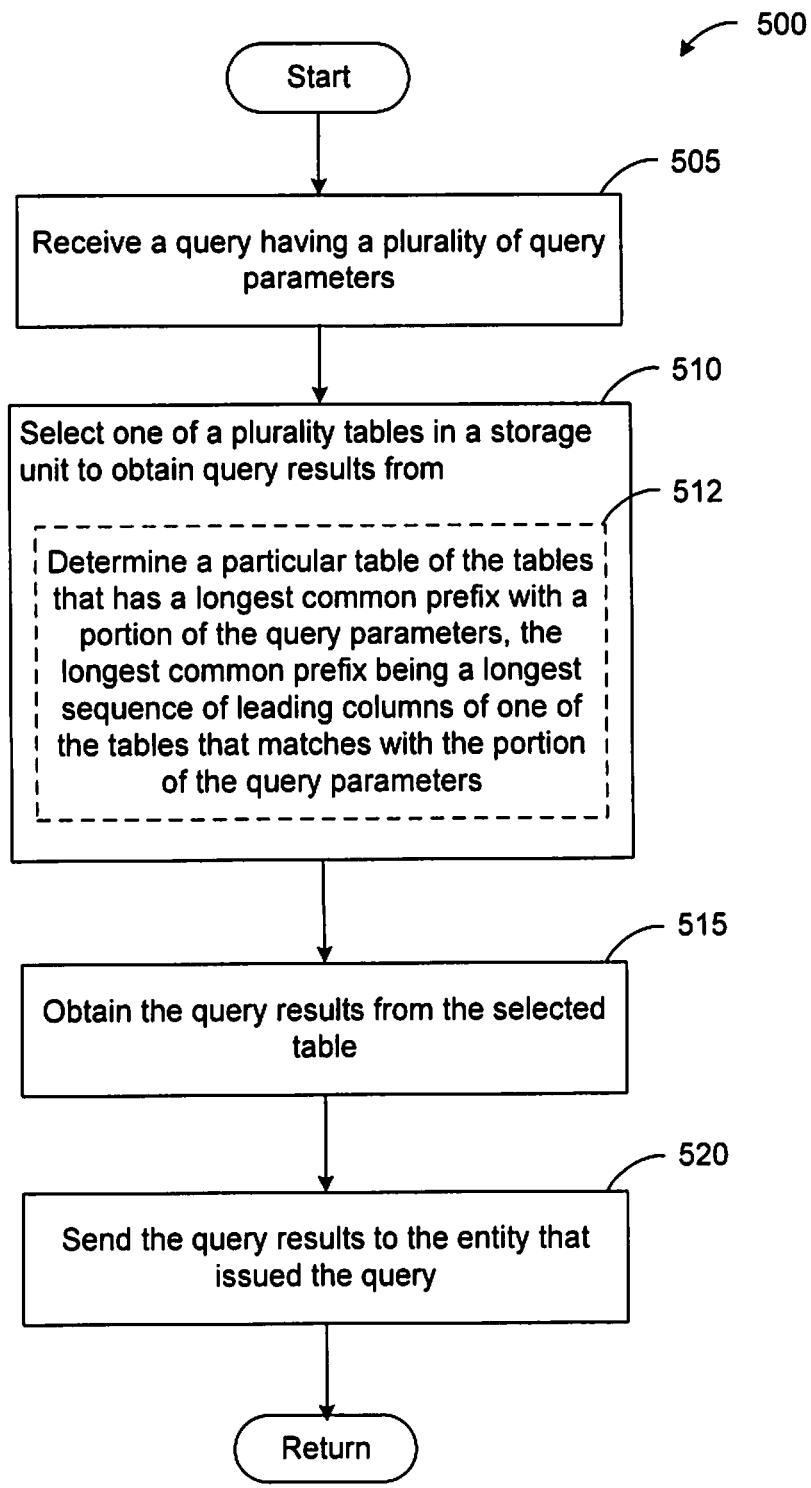
FIG. 5 is flow diagram illustrating a process of selecting a table to obtain the query results from, based on a received query.

FIG. 5 is a flow diagram illustrating a process 500 for selecting a table based on a query to obtain the query results from, according to an embodiment of the disclosed technique. The process 500 may be executed in a system such as system 200 of FIG. 2. At step 505, the query receiving unit 215 receives a query having a plurality of query parameters. In an embodiment, the query may be issued by an entity such as a user, application, etc. in the social networking system 105.

At step 510, the table selecting unit 220 selects one of a plurality of tables in the storage unit 240 to obtain the query results from. In an embodiment, the table selecting unit 220 selects a table that has least number of rows to be read from. The table selecting unit 200 identifies such a table by determining a table that has longest common prefix with a portion of the query parameter, as indicated by step 512. In an embodiment, the longest common prefix includes a longest sequence of leading columns of a table that matches with the filter criteria of the query.

At step 515, the query response unit 225 obtains the query results from the table selected in step 510. At step 520, the query response unit 225 sends the query results to the entity that issued the query.

Figure 6:
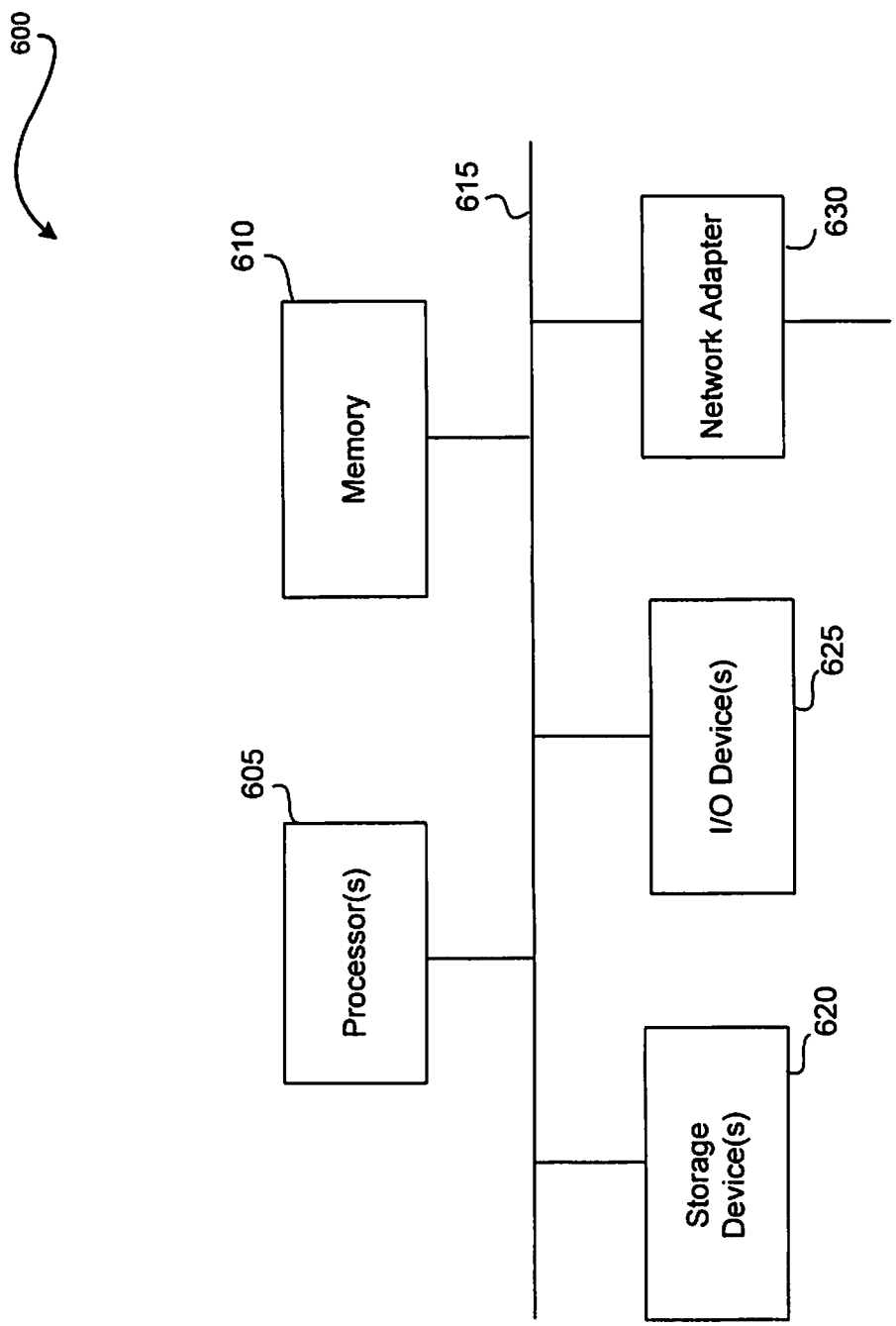
FIG. 6 is a block diagram of a processing system that can implement operations of the present invention.

FIG. 6 is a block diagram of an apparatus that may perform various operations, and store various information generated and/or used by such operations, according to an embodiment of the disclosed technique. The apparatus can represent any computer or processing system described herein. The processing system 600 is a hardware device on which any of the entities, components or services depicted in the examples of FIGS. 1-5 (and any other components described in this specification) can be implemented, such as query prediction unit, storage unit, stats depot etc. The processing system 600 includes one or more processors 605 and memory 610 coupled to an interconnect 615. The interconnect 615 is shown in FIG. 6 as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 605 is/are the central processing unit (CPU) of the processing system 600 and, thus, control the overall operation of the processing system 600. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 610 is or includes the main memory of the processing system 600. The memory 610 represents any form of random access memory (RAM), read-only memory (ROM), flash memory, or the like, or a combination of such devices. In use, the memory 610 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 605 through the interconnect 615 are a network adapter 630, a storage device(s) 620 and I/O device(s) 625. The network adapter 630 provides the processing system 600 with the ability to communicate with remote devices, over a network and may be, for example, an Ethernet adapter or Fibre Channel adapter. The network adapter 630 may also provide the processing system 600 with the ability to communicate with other computers within the cluster. In some embodiments, the processing system 600 may use more than one network adapter to deal with the communications within and outside of the cluster separately.

The I/O device(s) 625 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 610 can be implemented as software and/or firmware to program the processor(s) 605 to carry out actions described above. In certain embodiments, such software or firmware may be initially provided to the processing system 600 by downloading it from a remote system through the processing system 600 (e.g., via network adapter 630).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 620 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method, comprising:
   receiving, at a computer system in a computer network, information regarding multiple data attributes associated with an application;
   analyzing, by the computer system, the data attributes to determine cardinality information of the data attributes;
   predicting, by the computer system and based at least in part on a set of queries received at the computer system, a set of the data attributes to be requested in the future;
   generating, by the computer system and based at least in part on the cardinality information and the set of the data attributes, multiple tables, wherein different tables have different subsets of the data attributes as columns of the tables, wherein the multiple tables include a first table and a second table, wherein the first table and the second table both contain at least some common columns;
   receiving, at the computer system and from an entity, a query having a plurality of query parameters;
   selecting, by the computer system, one of the multiple tables in a storage system to obtain query results from, wherein selecting the one of the multiple tables includes:
     analyzing the multiple tables to determine a prefix of each of the multiple tables, and
     selecting a specified table of the multiple tables that has a longest common prefix with the query parameters, the longest common prefix being one of the determined prefixes containing a longest sequence of a plurality of leading columns that matches with a portion of the query parameters; and
   obtaining, in response to the query, the query results from the specified table.

2. The method of claim 1 further comprising:
   sending the query results to the entity that issued the query.

3. The method of claim 1, wherein the query parameters include at least one of (a) names of columns, (b) filter criteria, or (c) aggregation criteria.

4. The method of claim 3, wherein selecting the one of the tables with the longest common prefix includes selecting the particular table in which the longest sequence of the columns matches with columns of filter criteria.

5. The method of claim 1, wherein generating the tables includes:
receiving the set of the data attributes as a user selection of a first list of columns, wherein the first list of columns is a subset of a finite set of columns on which potential user queries can be executed,
determining the cardinality information of the first list of columns,
expressing at least the first list of columns and the cardinality information of the first list of columns as a meta query language,
determining different subsets of the finite set of columns using the meta query language, and
generating the tables with the determined different subsets of the finite set of columns.

6. The method of claim 5, wherein determining cardinality information of the first list of columns includes determining cardinality information of at least one of (a) individual columns in the first list of columns, or (b) a particular column in combination with another column from the first list of columns.

7. The method of claim 5, wherein each of the tables has a determined subset of the columns in a decreasing order of the cardinality of the columns.

8. The method of claim 5, wherein determining different subsets of the finite set of columns includes:
determining, by the computer system, a second list of columns of the finite set of columns for which at least one of (i) user queries is received frequently, or (ii) data is increasing in volume.

9. The method of claim 1, wherein selecting one of the tables includes selecting the particular table which has least number of total rows to be read by the query to obtain the query results based on the query parameters.

10. A non-transitory computer-readable storage device storing computer-readable instructions, comprising:
instructions for receiving, by a computer system in a computer network, a user selection of a list of columns, wherein the list of columns is a subset of a finite set of columns;
instructions for analyzing, by the computer system, the list of columns to determine cardinality information of the list of columns, wherein the analyzing includes expressing at least the list of columns and the cardinality information of the list of columns as a meta query language;
instructions for predicting, by the computer system and based at least in part on a set of queries received at the computer system, a set of the columns to be requested in the future;
instructions for determining, by the computer system and based at least in part on the cardinality information and the set of the columns, different subsets of the set of columns using the meta query language;
instructions for generating, by the computer system, multiple tables in a storage system, each of the multiple tables having one of the different subsets of the set of columns;
instructions for receiving, from an entity in the computer network, a query having a plurality of query parameters; and
instructions for selecting, by the computer system and in response to receiving a query, one of the multiple tables to obtain query results from, wherein selecting the one of the multiple tables includes:
analyzing the multiple tables to determine a prefix of each of the multiple tables, and
selecting a specified table of the multiple tables that has a longest common prefix with query parameters, the longest common prefix being one of the determined prefixes containing a longest sequence of a plurality of leading columns that matches with the query parameters; and
instructions for obtaining, in response to the query, the query results from the selected table.

11. The non-transitory computer-readable storage device of claim 10 further comprising:
instructions for sending the query results to the entity that issued the query.

12. The non-transitory computer-readable storage device of claim 10, wherein the instructions for selecting the one of the tables with the longest common prefix includes instructions for selecting the particular table in which the longest sequence of the columns matches with columns of filter criteria in the query parameters.

13. The non-transitory computer-readable storage device of claim 10, wherein the selected particular table has least number of total rows to obtain the query results from.

14. The non-transitory computer-readable storage device of claim 10 further comprising:
instructions for retrieving statistical information from the storage system, the statistical information including information pertaining to management of the tables;
instructions for determining, at predefined time intervals, criteria for adapting the tables based on the statistical information; and
instructions for adapting, at predefined intervals, the tables, the adapting including at least one of (a) creating one or more new tables, (b) altering one or more existing tables, or (c) deleting one or more existing tables.

15. An apparatus, comprising:
a processor;
a table management criteria unit configured to:
receive information regarding multiple data attributes associated with an application,
analyze the data attributes to determine cardinality information of the data attributes, and
predict, based at least in part on a set of queries received at the computer system, a set of the data attributes to be requested in the future;
a table management unit configured to generate, based at least in part on the cardinality information and the set of the data attributes, multiple tables, wherein different tables have different subsets of the data attributes as columns of the multiple tables;
a query receiving unit configured to receive a query from an entity, the query having a plurality of query parameters;
a table selecting unit configured to select one of the multiple tables in a storage system to obtain query results from, the table selecting unit configured to select the one of the multiple tables by:
analyzing the multiple tables to determine a prefix of each of the multiple tables, and selecting a specified table of the multiple tables that has a longest common prefix with the query parameters, the longest common prefix being one of the determined prefixes containing a longest sequence of a plurality of leading columns that matches with the query parameters; and a query response unit to obtain, in response to the query, the query results from the specified table.

16. The apparatus of claim 15 wherein the table management criteria unit is further configured to:

receive the set of the data attributes as a user selection of a first list of columns, wherein the first list of columns is a subset of a finite set of columns on which potential user queries can be executed, express at least the first list of columns and the cardinality information of the first list of columns as a meta query language, and determine different subsets of the finite set of columns using the meta query language.

17. The apparatus of claim 16, wherein the table management criteria unit is further configured to:

retrieve statistical information from a storage system of the apparatus, the statistical information including information pertaining to management of the tables, and determine, at predefined time intervals, criteria for adapting the tables based on the statistical information, the adapting the tables including at least one of (a) creating one or more new tables, (b) altering one or more existing tables, or (c) deleting one or more existing tables.

* * * * *